United States Patent [19]

Ferroni

[11] Patent Number: 5,349,615
[45] Date of Patent: Sep. 20, 1994

[54] CORE MELT-THROUGH RETENTION DEVICE FOR LIGHT-WATER REACTORS

[75] Inventor: Ferruccio Ferroni, Zürich, Switzerland

[73] Assignee: Elektrowatt Ingenieurunternehmung AG, Zurich, Switzerland

[21] Appl. No.: 108,362

[22] Filed: Aug. 18, 1993

[30] Foreign Application Priority Data

Sep. 14, 1992 [EP] European Pat. Off. ........ 92810708.5

[51] Int. Cl.$^5$ ........................................... G21C 9/016
[52] U.S. Cl. ................................................. 376/280
[58] Field of Search ............. 376/280; 976/DIG. 143

[56] References Cited

U.S. PATENT DOCUMENTS

| | | | |
|---|---|---|---|
| 4,073,682 | 2/1978 | Barleon et al. | 376/280 |
| 4,464,333 | 8/1984 | Wohlsen | 376/280 |
| 5,057,271 | 10/1991 | Turricchia | 376/280 |
| 5,263,066 | 11/1993 | Szabo et al. | 376/280 |

FOREIGN PATENT DOCUMENTS

| | | |
|---|---|---|
| 2363845 | 6/1975 | Fed. Rep. of Germany . |
| 2459339 | 7/1976 | Fed. Rep. of Germany . |
| 2307338 | 11/1976 | France . |

*Primary Examiner*—Daniel D. Wasil
*Attorney, Agent, or Firm*—Townsend and Townsend Khourie and Crew

[57] ABSTRACT

The device (4) for the retention of core melt-through in light-water reactors by means of a crucible (40) disposed beneath the reactor pressure vessel (2) comprising of a vat (41) and a plurality of sack-like protuberances (42) on its underside and also of a metal lid (43). The lid forms a water-tight upper seal for the crucible and has a reinforcement (43b) to absorb the kinetic energy of the impact of the core melt-through. The crucible consists of a metal wall (40a), which is lined with a ceramic material (40b)—preferably made from high-temperature isostatic pressed boron nitride. The device (4) is disposed in a water-filled cooling basin (32), which forms the lowest part of the containment sump and which can be constructed as a cavity in the containment foundation. The water vaporized during cooling if the requirements are met condenses on the walls of the containment and flows back into the containment sump.

12 Claims, 2 Drawing Sheets

CORE MELT-THROUGH RETENTION DEVICE FOR LIGHT-WATER REACTORS

BACKGROUND OF THE INVENTION

The invention relates to a device for the retention of core melt-through-in the event of a core melt-through accident in light-water reactors and also to a reactor plant having such a device. Because of the afterheat of the reactor core, which is produced because of the radioactive fission products, the core melts if the cooling water empties from the reactor pressure vessel because of an accident; the molten mass of the core penetrates the wall of the pressure vessel. If there is no retention device to collect the molten mass, then the foundation of the building is also breached by the molten mass, with the concrete being decomposed because of the high melting temperature (over 2500° C.) with the formation of hydrogen, carbon monoxide, carbon dioxide and water vapour. The molten mass of the core is essentially composed of uranium oxide, zirconium and steel in the ratio of roughly 6:1:3.

Various safety concepts have been developed to prevent the hypothetical consequences of serious accidents in light-water reactors, in particular of core melt-through accidents. Thus for example a core melt-through retention device ("core catcher") has been proposed, in which a shaft-like collecting basin for the molten mass is provided beneath the reactor core (R. Hammond, J. Dooley, 1982 "Retrofitting Core Catcher to Nuclear Plants", NUREG/CR-2941; or U.S. Pat. No. 4,036,688). This known device consists of an upper section, which is cylindrical (diameter: 3.5-5 mm, height: 10-15 m) and a lower section, which tapers conically downwards (height: 20-25 m). The upper section is lined with highly refractory material and the lower section is constructed as a water-cooled, double-walled steel crucible. This crucible is filled with a siliceous or oxidic ceramic bulk material. With the cooling system provided there is the danger of the inner crucible wall being perforated by the molten mass, as a result of which radioactive fission products of the molten mass can be released into the atmosphere.

SUMMARY OF THE INVENTION

The object of the invention is to create inside the containment a collecting basin for the molten mass of the core, which is constructed as a crucible for the safe and long-term retention of the molten mass at high temperatures. The molten mass of the core collected in the crucible of the device according to the invention is cooled in the cooling basin by sump water, which comes partly from the broken primary water circuit. The water vaporised on cooling condenses on the walls of the containment and flows back into the containment sump again.

The crucible lining should be as inert as possible with respect to the molten mass of the core. When the molten mass solidifies a solid layer—a "secondary crucible"—is constructed in the edge zones of the crucible, which produces a protective action for the wall of the retention device. Until the formation of this secondary crucible, the material of the lining can only react with the molten mass to a limited extent. It is therefore advantageous if a non-oxidising ceramic is chosen for the crucible lining. So that the protective secondary crucible is quickly formed, the heat has to be conducted away easily by the lining. High-temperature isostatic pressed boron nitride—"HIP-BN"—meets these requirements (thermal conductivity: 49 W/m·K at 20° C.; 28 W/m·K at 800° C.) and offers various other advantages.

Thanks to the boron a recriticality of the molten mass of the core can be prevented. Boron nitride (BN) has a poor wettability with respect to the molten mass of the core. The melting point of BN is high; it is roughly 3000° C. BN is characterised by a good thermal fatigue resistance and a good compressive strength. BN is resistant in air up to a temperature of 1000° C.

With regard to construction the simplest method is to construct the protuberances on the crucible vat as circular cylindrical cooling tubes. Low-alloy steel can be used for the external crucible wall. On the bottom of the vat between the cooling tubes is advantageously provided a thick guard plate, with which the lining can be protected against the impact of the molten mass of the core. This guard plate is melted by the molten mass of the core if the requirements are met (i.e. in the event of a core melt-through accident). The crucible lid, which forms a water-tight seal for the crucible, can be composed of steel plates, for example by horizontal plates being welded to vertical plates disposed in a honeycomb, which protrude into the interior of the crucible vat. The honeycomb lid reinforcement can be placed on the guard plate of the base of the vat. With the retention of the molten mass of the core if the requirements are met, first of all the kinetic energy of the falling molten mass of the core is converted into deformation energy; then the crucible lid is melted through. The volume of the crucible has such dimensions that the crucible is filled by the molten mass to roughly 10 cm above the vat base, for example.

The cooling basin may be provided as the deepest part of the containment sump; it can be constructed as a cavity in the foundation plate of the containment. The crucible lid guarantees that no water penetrates into the crucible, even if it is flooded by incoming primary water. The cooling basin is always filled with water.

A distinction can be made between two ways in which the reactor pressure vessel may malfunction, which are referred to by the designations "low pressure path" and "high pressure path" respectively. In the case of the low pressure path the molten mass of the core flows through a melted-open perforation in the reactor vessel. In the case of the high pressure path the lower spherical section of the reactor pressure vessel is centrifuged away with the molten mass of the core located therein. In order to control the high pressure path, a collecting structure has to be provided between the reactor pressure vessel and the retaining device, with which the retaining device can be screened from the wall piece blown off the pressure vessel. This collecting structure is advantageously constructed in a funnel shape so that the molten mass can be directed into the central region of the retaining device.

The steam produced during the cooling of the retention device filled with molten mass can freely spread in the interior of the containment. Thanks to the condensation of the steam on the walls an equilibrium pressure can be balanced out; this depends on the heat dissipation of the containment to the atmosphere. It is possible for the pressure to rise to an unacceptable level. In order to redress such a pressure build-up, the containment has to be connected to a filtered pressure relief device (device for the filtered relief of pressure).

BRIEF DESCRIPTION OF THE DRAWINGS

The invention is illustrated below by means of drawings.

DESCRIPTION OF THE PREFERRED EMBODIMENT

Figure 1:
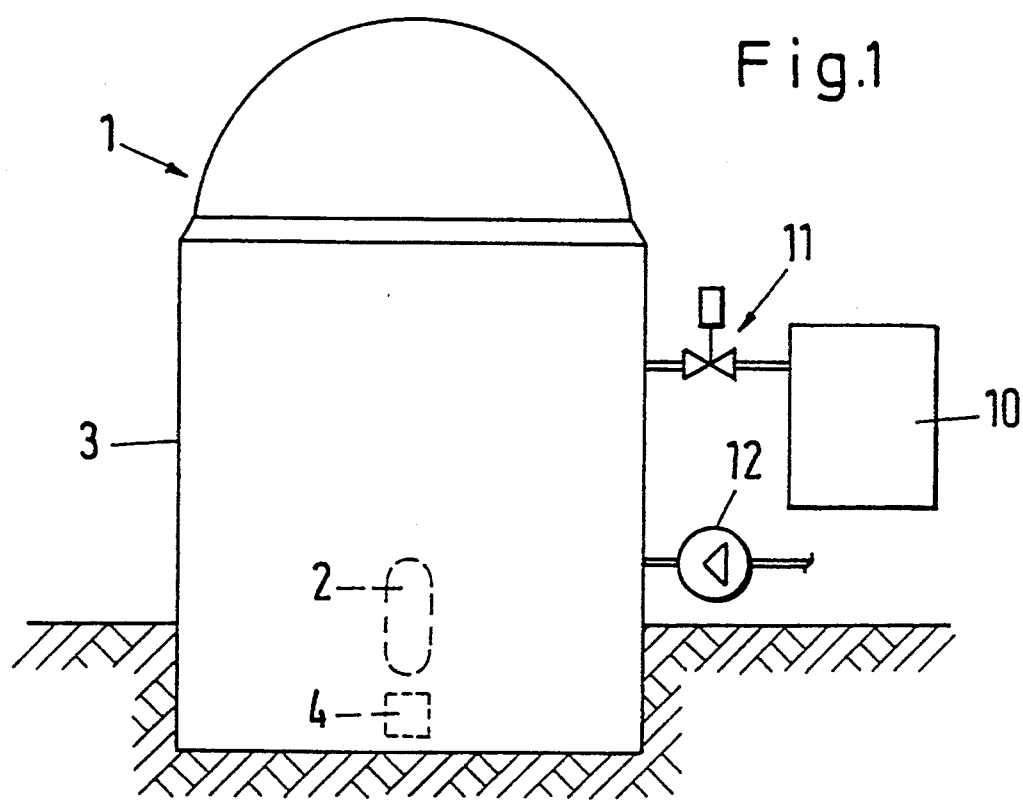
FIG. 1 shows a view of a reactor plant.
Figure 2:
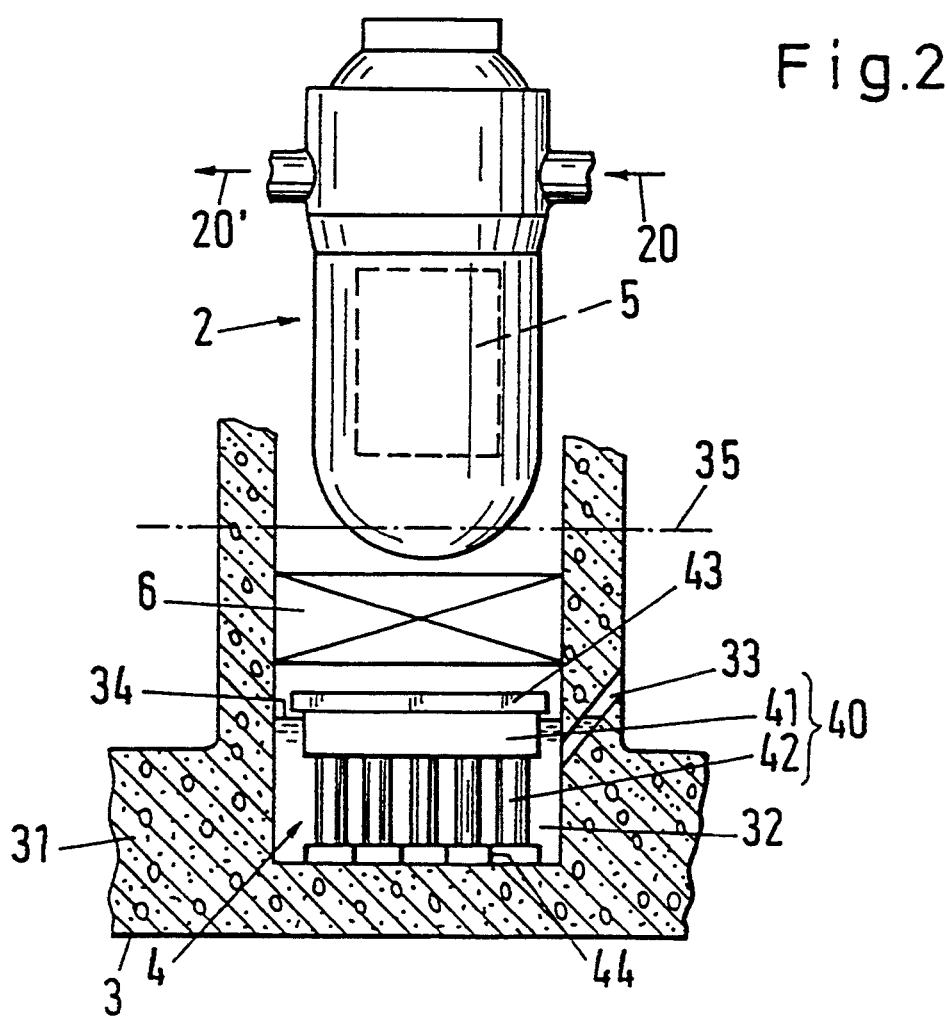
FIG. 2 shows a reactor pressure vessel with a core melt-through retention device as specified by the invention.

The reactor plant 1 in FIG. 1 with the reactor pressure vessel 2 and the containment 3 contains a core melt-through retention device 4. The containment 3 is connected to a device 10 for filtered pressure relief, the connection line comprising a controllable shut-off device 11. If necessary water can be introduced into the containment with the pump 12.

The reactor pressure vessel 2 with the reactor core 5 is cooled by the primary water 20 and 20' respectively. In the foundation plate 31 of the containment 3 is located the cooling basin 32 of the retention device 4 according to the invention constructed as a cavity. The cooling basin 32 forms the lowest part of the containment sump; it is connected to the remaining part of the sump by ducts 33. The device 4 is composed of a crucible 40, which consists of a vat 41 and a plurality of tubular protuberances 42, and a lid 43. The cooling tubes 42 are connected to the concrete foundation 31 by means of a connecting structure 44, which consists of brackets, for example. The connecting structure 44 enables firstly the cooling of the cooling tubes 42 on its underside; secondly its purpose is to permit an unimpeded extension of the retention device 4 in order to keep thermal stresses small. Between the reactor pressure vessel 2 and retention device 4 is shown a collecting structure 6, and function of which has already been explained above. The level 34 indicates the water level of the cooling basin 32 in the state of readiness; the dot-dash line 35 signifies the water level if the requirements are met.

Figure 3:
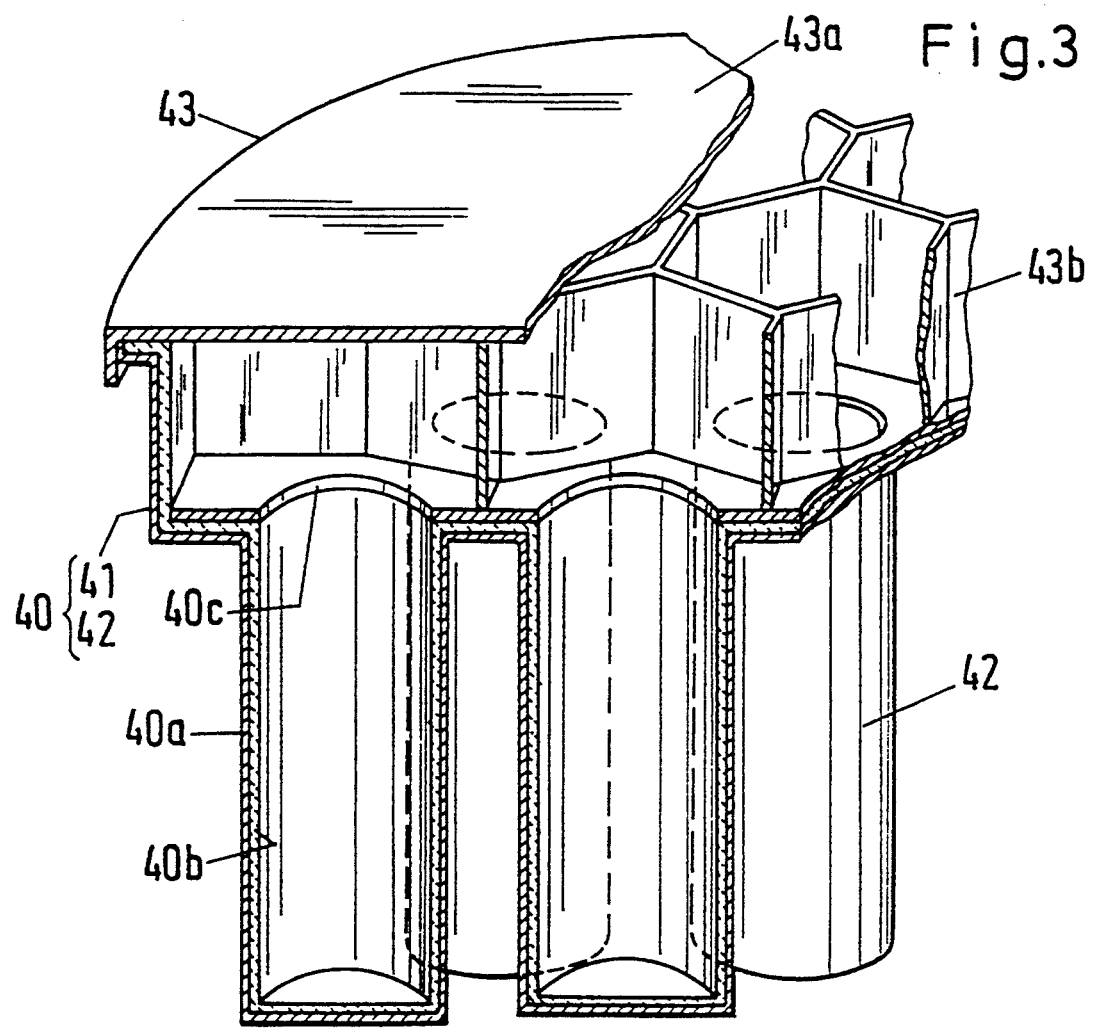
FIG. 3 shows a perspective representation of a part of the retention device from FIG. 2

The section of a retention device 4 according to the invention shown in FIG. 3 shows four cooling tubes 42, two of these tubes 42 being shown longitudinal section. The walls of the vat 41 and of the tubes 42, which form the crucible 40, are formed by a steel wall 40a and a ceramic lining 40b made of HIP-NB, for example. The vat base is covered by a guard plate 40c. The crucible lid 43 consists of a cover plate 43a and a honeycomb-like reinforcing structure 43b. The lid 43 is tightly connected to the crucible 40.

Figure 4:
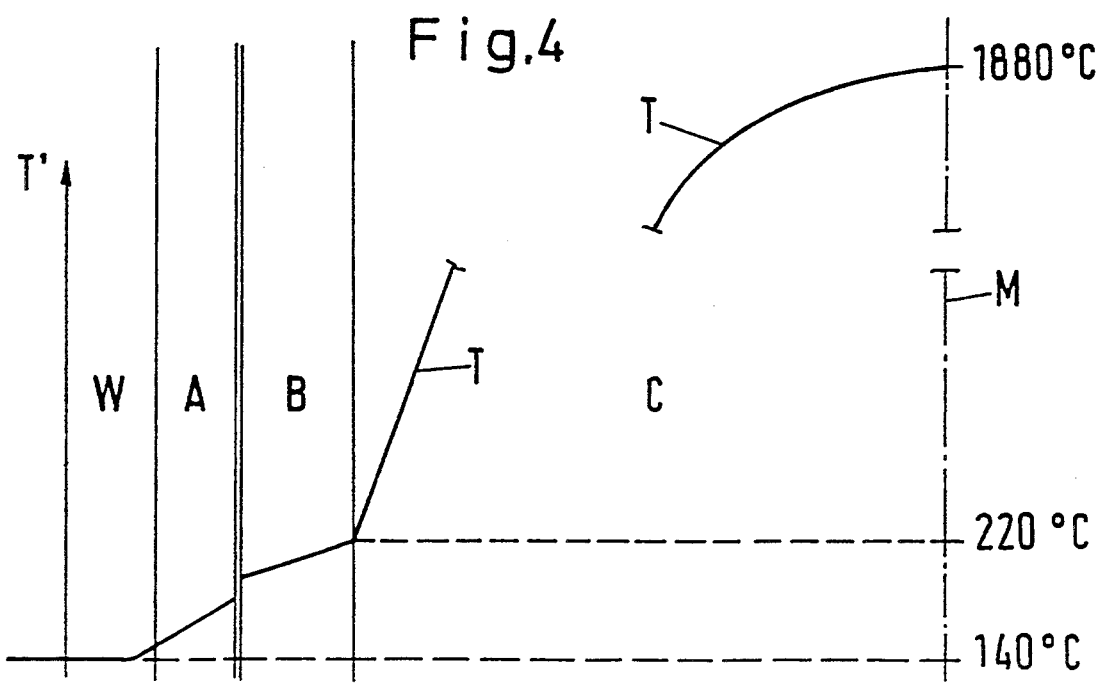
FIG. 4 shows a diagram with a temperature distribution which has been calculated for a cooling tube of the device shown in FIG. 3.

The curve T in the diagram of FIG. 4 shows the radial distribution of the calculated temperature T' in a cooling tube 42. The dot-dash line M corresponds to the axis of the cooling tube. The zones W, A, B and C correspond to the cooling water of the cooling basin 32, the steel wall 40a, the ceramic lining 40b (made of HIP-BN) and the interior of the cooling tube 42 respectively. The following parameters govern the calculation of the curve T: afterheat production = 1 $MW/m^3$, internal diameter of the cooling tube = 30 cm, wall thickness of the steel tube = 8 mm, wall thickness of the boron nitride tube = 10 mm; between the two tubes is assumed a gap having a resistance of 0.55 $W/cm^2 \cdot K$. The three temperatures given in FIG. 4 are rounded values; the distribution of curve T has only been roughly reproduced.

For a reactor having a thermal output of 3000 MW (afterheat of roughly 20 MW, three hours after subjection to the nuclear fission) is to be provided a core melt-through retention device as specified by the invention, which comprises a height of roughly 2.5 m and a diameter of roughly 7 m. The number of cooling tubes having an internal diameter of 30 cm and a length of 1.8 m is roughly 170 with this device.

I claim:

1. A device for the retention of molten mass from a core melt-through in a light-weight reactor pressure vessel comprising:

a water filled cooling basin beneath the pressure vessel; and a crucible disposed within the cooling basin, the crucible having a metal wall lined with a ceramic material and including a container with a plurality of cooling tubes extending from a lower wall of the container, a lid that forms a watertight upper seal for the container and a reinforcement structure disposed within the container for absorption of kinetic energy from the molten mass.

2. A device according to claim 1 wherein the ceramic lining is made from a non-oxidizing ceramic, which has a thermal conductivity of more than 10 W/m K, at 800° C., the ceramic lining having a wall thickness of at least 5 mm.

3. A device according to claim 2 wherein the ceramic lining is made from high-temperature isostatically pressed boron nitride.

4. A device according to claim 1, wherein the metal wall of the crucible is made from low-alloy steel.

5. A device according to claim 1 wherein the lower wall of the container is covered with a guard plate made of steel.

6. A device according to claim 1 wherein the cooling tubes have a cylindrical shape.

7. A device according to claim 1 wherein the lid is composed of a steel plate the reinforcement structure comprising a honeycomb structure of interlocking vertical plates in the container, the vertical plates being welded to the steel plate.

8. A device according to claim 1 wherein the crucible is at least 10 cm deep.

9. The device of claim 1 further including a generally conical collecting structure disposed between the pressure vessel and the retention device, the pressure vessel having an outer wall, the collecting structure being adapted to protect the retention device from a section of the outer wall being blown off the pressure vessel and to direct the molten mass into the container.

10. A core reactor plant comprising:

a reactor pressure vessel having an outer wall;

a containment foundation for housing the pressure vessel;

a retention device disposed within the containment foundation for retaining molten mass from a core melt-through in the pressure vessel, the retention device comprising:

a water filled cooling basin beneath the pressure vessel; and a crucible disposed within the cooling basin, the crucible having a metal wall lined with a ceramic material and including a container with a plurality of cooling tubes extending from a lower surface of the container, a lid that forms a watertight upper seal for the container and a reinforcement structure disposed within the container for absorption of kinetic energy from the core melt-through; and a generally conical collecting structure disposed between the pressure vessel and the retention device, the collecting structure being adapted to protect the retention device from a section of the outer wall being blown off the pressure vessel and to direct the molten mass into the container.

11. A plant according to claim 10 wherein the cooling basin of the retention device is formed from a cavity in the containment foundation.

12. A plant according to claim 10 further comprising a relief passage connected to the containment foundation for relieving pressure from the molten mass in the cooling basin.

* * * * *